Nov. 3, 1942.   M. VAWRYK   2,300,716
SOLDERING IRON
Filed April 12, 1940
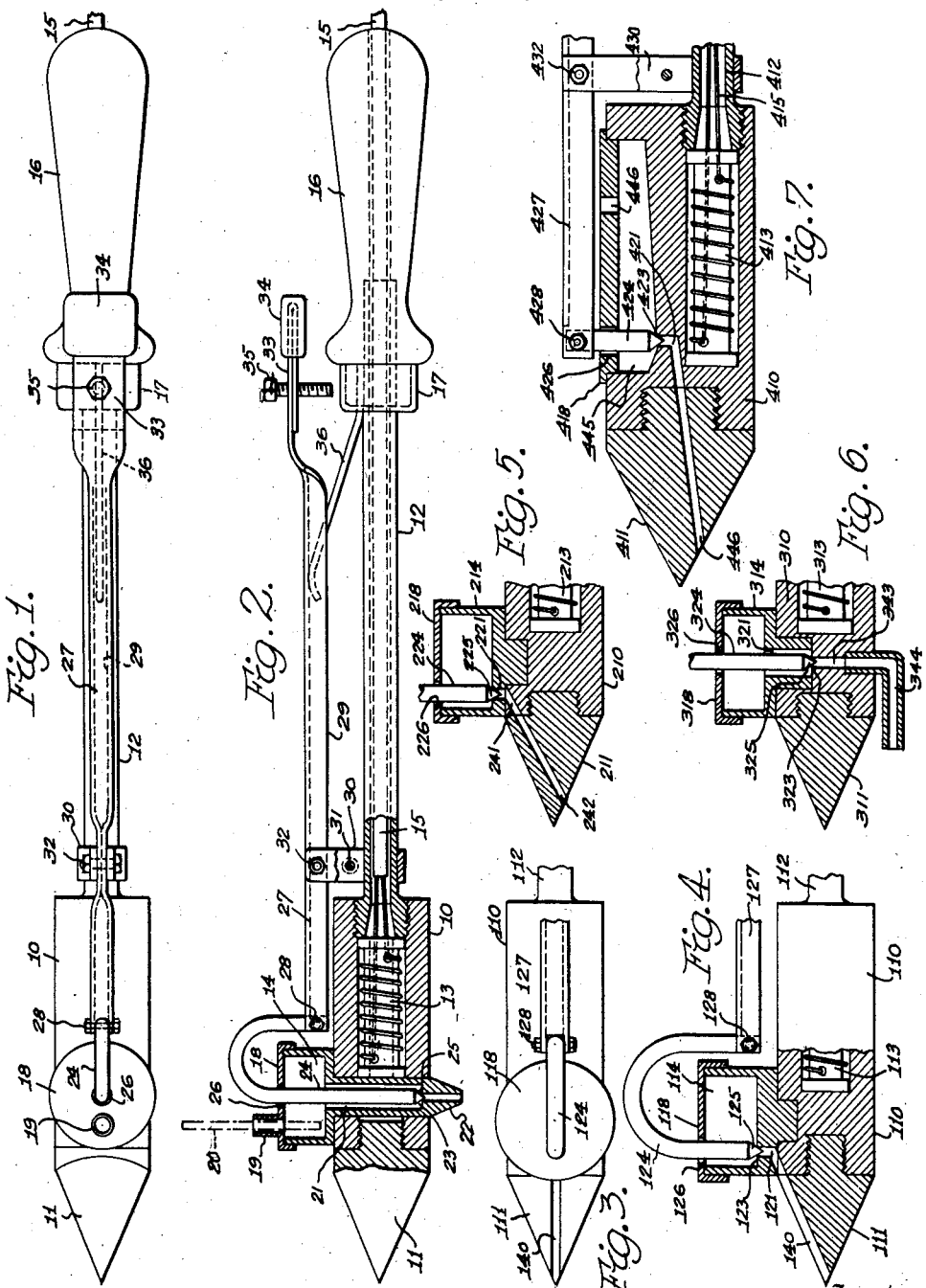
Inventor
Mike Vawryk,
By
Attorneys Patented Nov. 3, 1942

2,300,716

UNITED STATES PATENT OFFICE 2,300,716

SOLDERING IRON

Mike Vawryk, Ecorse, Mich.

Application April 12, 1940, Serial No. 329,217

1 Claim. (Cl. 219—27)

This invention relates to a new and useful improvement in soldering irons. It finds particular application to irons which are electrically heated.

One object of this invention is to provide a source of solder integral with the soldering iron in such manner that the solder may be applied to the work directly from the iron, instead of from an independent source.

Another object of the invention is to provide a heating element to heat the iron and at the same time melt the solder so that, under control of the operator, it may be applied to the work in the desired place in molten form.

A further object of the invention is to provide a receptacle attached to the iron for the storage of molten or solid solder.

Another object of the invention is to provide a conduit for conveying the molten solder from the receptacle to a convenient point whence it may be applied to the work.

A further object of the invention is to provide a valve to control the emission of solder from the receptacle.

Other and further objects of the invention will more fully appear in the following description, reference being made to the accompanying drawing in which:

Figure 1 is a plan view of the device;

Fig. 2 is a side elevation of the same, being partially in section;

Fig. 3 is a plan view of a modification of the invention;

Fig. 4 is a side elevation of the modification shown in Fig. 3 being partially in section;

Fig. 5 is a sectional view of the head of an iron embodying a modification of the invention;

Fig. 6 is a sectional view of the head of an iron embodying a modification of the invention;

Fig. 7 is a sectional view of the head of an iron embodying a modification of the invention.

In ordinary soldering a series of operations is usually performed by the operator, including at least the following: applying flux to the surface of the parts of work to be joined, positioning the parts in proper relation to each other, holding the parts in place for the duration of the operation, applying solder to the joint, and heating the parts of the work so as to make them properly receptive to the solder and thus making possible a strong joint. In such a series of operations the workman finds some difficulty, especially where the working space is limited as in radio work, in performing all of the operations with the two hands at his disposal. The present device is intended to be used so that the solder may be applied to the work from the soldering iron, thus simplifying the sequence of operations by making the application of the solder and the heating of the parts to be joined practically one step.

The device employs a head 10 to which is attached a soldering tip 11. Extending from the other end of the head is a handle 12, made in this instance of hollow tubing or the like. Within the head is a heating element 13 of any type which supplies heat to the tip 11 and also to the reservoir 14, as hereinafter set forth. Electricity to energize the heating element is delivered through a cord 15 extending through the hollow handle 12. At the opposite end of the handle 12 is a hand grip 16 to be held by the operator and shaped so as to be conveniently grasped. The cord 15 extends through the hand grip 16 and may be connected to any suitable electrical outlet. Fitted to the hand grip is a collar 17.

Fitting upon the head 10 is a reservoir 14 which may be partially filled with solder. The heat from the heating element 13 warms the solder and causes it to melt. Upon the reservoir is a cap 18. A hole may be drilled in the cap 18 and a short piece of tubing 19 may be affixed over the hole to form a guideway for a piece of stick or wire solder 20 which will gradually melt as molten solder is withdrawn from the reservoir. The guideway 19 offers slight frictional resistance to the passage of the stick solder 20 therethrough and hence prevents the entire piece from sliding into the reservoir at once. At the bottom of the reservoir is a hole to which is connected a duct 21. The duct 21 extends through a hole in the head 10 and the solder therein is kept in molten state by the heating element 13. The duct 21 terminates in a tip 22 having the exterior configuration of a truncated cone and having a hole longitudinally therein. The interior diameter of the tip is smaller than that of the duct 21 so that a shoulder 23 occurs at the plane of division between the interior diameter of the duct 21 and the tip 22. Fitting within the duct 21 is a stem 24 having a tapered point 25. The tapered point 25 fits within the hole in the tip 22 and abuts the shoulder 23 in a certain position along the taper of the point 25. Movement of the stem 24 upward opens the hole in the tip 22 and allows solder to flow from the duct 21 through the tip 22 and onto the work at a desired point.

The stem 24 passes through a hole 26 in the cap 18 and then is bent in a U shape and downward to a point near the head. A lever 27 is attached to the stem 24 by means of a bolt 28 or a pin. The lever 27 may be formed of a channel with the flanges 29 pointing downwardly. A bracket 30 is affixed about the handle 12 and held tightly about the handle by a bolt 31 or rivet. The upper portion of the bracket fits over the lever 27, which is flattened in this region as shown in the drawing, Fig. 1. A bolt 32 passes through the bracket and the lever and provides a fulcrum for rocking movement of the lever. The remote end of the lever is fitted with a handle 33 of a convenient form as shown in the drawing and a heat insulating end piece 34 is attached. A screw 35 fits through the handle 33 and upon depression of the handle 33 by the operator is stopped by the collar 17. The screw 35 is adjustable, and adjustment thereof determines the travel of the stem 24 within the duct 21. Such adjustment governs the quantity of solder which passes out of the tip 22. A spring 36 is fixed within the hand grip 16 and bears against the lever 27, fitting between the flanges 29 of the lever. The force exerted upwards by the spring tends to keep the tapered point 25 bearing against the shoulder 23 and hence tends to prevent solder from flowing from the duct 21 when the operator is not depressing the handle 33.

In the modification shown in Figs. 3 and 4, a reservoir 114 is employed having a cap 118 fitting thereupon. The stem 124 fits through the hole 126. The tapered point 125 of the stem 124 fits within the opening of the duct 121 and abuts the shoulder 123. The duct 121 is so drilled as to be angular. The duct 121 terminates adjacent a groove 140 formed in the surface of the tip 111. When the stem 124 is raised, solder flows through the duct 121 and the groove 140 to the point of the tip 111 of the iron.

The modification shown in Fig. 5 is similar to that of Figs. 3 and 4. A duct 221 is formed in the reservoir 214 and opens into the hole 241 in the head 210. The hole 241 terminates in such position as to align with a hole 242 drilled in the tip 211, which terminates adjacent the point of the tip. Solder flows through the duct 221 and the holes 241 and 242 and discharges near the point of the tip 211.

In Fig. 6 is shown a modification in which the reservoir 314 is connected with a duct 321 which in turn is connected with a hole 343. A piece of tubing 344 bent at right angles is fitted into the head 310 so that solder flows from the reservoir 314 into the duct 321 into the hole 343 and then into the tubing 344. It is discharged at the end of the tubing 344. The tapered point 325 of the stem 324 abuts the shoulder 323 at the bottom of the duct 321 in order to cut off discharge of solder.

In Fig. 7 a further modification is illustrated. Here the heating element 413 is disposed at the bottom of the iron. A sump 445 which constitutes a reservoir is formed in the head 410 so that solder tends to drain toward the bottom of the sump 445 wherein is drilled the duct 421. The stem 424 is tapered and abuts the shoulder 423. The duct is drilled in such manner that it aligns with a hole 446 in the tip 411 which terminates adjacent the point of the tip 411. A cover 418 fits over the sump 445 and receives the stem 424. A hole 446 may be made in the cover 418 through which stick or wire solder may be supplied to the reservoir.

What I claim is:

In a soldering iron, a body portion, a solder reservoir external of said body portion and resting thereon, a duct member depending from said solder reservoir and communicating therewith and extending through an aperture in said body portion and terminating externally of said body portion opposite said solder reservoir, and valve means controlling the flow of solder from said reservoir into said duct, said reservoir, said duct and said valve means being unitarily removable and replaceable in said body portion.

MIKE VAWRYK.